(12) United States Patent
Bolis et al.

(10) Patent No.: US 12,085,740 B2
(45) Date of Patent: Sep. 10, 2024

(54) TUNABLE DIFFRACTIVE OPTICS

(71) Applicant: Apple Inc., Cupertino, CA (US)

(72) Inventors: Sebastien Bolis, Crolles (FR); Nachiappan Chidambaram, Grenoble (FR)

(73) Assignee: APPLE INC., Cupertino, CA (US)

( * ) Notice: Subject to any disclaimer, the term of this patent is extended or adjusted under 35 U.S.C. 154(b) by 639 days.

(21) Appl. No.: 17/228,740

(22) Filed: Apr. 13, 2021

(65) Prior Publication Data

US 2021/0373210 A1   Dec. 2, 2021

Related U.S. Application Data

(60) Provisional application No. 63/030,938, filed on May 28, 2020.

(51) Int. Cl.
*G02B 5/18* (2006.01)
*G02B 27/42* (2006.01)

(52) U.S. Cl.
CPC ....... *G02B 5/1828* (2013.01); *G02B 27/4233* (2013.01)

(58) Field of Classification Search
CPC ........... H04N 2209/046; H04N 23/843; H04N 25/134; H04N 5/142; H04N 9/64; G02B 26/0875; G02B 26/103; G02B 27/0172; G02B 6/0008; G02B 6/262; G02B 6/3504; G02B 5/18; G02B 5/1828; G02B 5/1847; G02B 27/42; G02B 27/4233; G02B 27/4244; G02B 27/09; G02B 27/0933; G02B 27/0944; G02B 26/08; G02B 26/00; G02B 26/0808; G02B 26/0825; G02B 26/02; G02B 7/182; G02B 7/185

USPC ....... 359/291, 290, 295, 297, 665–667, 642, 359/315, 573, 231, 298, 846
See application file for complete search history.

(56) References Cited

U.S. PATENT DOCUMENTS

| | | | |
|---|---|---|---|
| 3,758,199 A * | 9/1973 | Thaxter | G02B 26/0816 359/224.1 |
| 4,332,473 A * | 6/1982 | Ono | G01D 5/38 250/237 G |
| 6,834,142 B2 | 12/2004 | Bailey et al. | |
| 7,920,330 B2 | 4/2011 | Aschwanden et al. | |

(Continued)

FOREIGN PATENT DOCUMENTS

| | | | | |
|---|---|---|---|---|
| CN | 108845416 A * | 11/2018 | | |
| WO | 19999048197 A3 | 9/1999 | | |
| WO | WO-2007082952 A1 * | 7/2007 | ............ | G01J 3/1804 |
| WO | 2020208380 A1 | 10/2020 | | |

OTHER PUBLICATIONS

Rodrigues et al "Strong piezoelectricity in single-layer graphene deposited on SiO2 grating substrates"; Nature Communications, Jun. 25, 2015 (Year: 2015).*

(Continued)

*Primary Examiner* — Jie Lei
(74) *Attorney, Agent, or Firm* — MEITAR PATENTS LTD.

(57) ABSTRACT

An optical component includes a substrate and a piezoelectric film formed on the substrate and configured to deform in response to an actuation voltage applied thereto into a pattern of peaks and troughs configured to deflect optical radiation that is incident thereon. The pattern has an amplitude determined by the actuation voltage.

18 Claims, 6 Drawing Sheets

(56) References Cited

U.S. PATENT DOCUMENTS

| | | | |
|---|---|---|---|
| 8,674,689 | B1 | 3/2014 | Nielson et al. |
| 9,733,402 | B2 | 8/2017 | Liu et al. |
| 9,976,952 | B2 | 5/2018 | Sriram et al. |
| 10,018,831 | B2 | 7/2018 | Corbelli et al. |
| 2003/0215183 | A1* | 11/2003 | Wildnauer ........... G02B 6/4246 385/27 |
| 2004/0212869 | A1* | 10/2004 | Srinivasan ............. G02B 6/266 359/295 |
| 2009/0238217 | A1 | 9/2009 | Moser et al. |
| 2020/0379250 | A1 | 12/2020 | Takashima et al. |
| 2021/0302659 | A1 | 9/2021 | Lee et al. |

OTHER PUBLICATIONS

Yu et al., "Tunable Optical Gratings Based o Buckled Nanoscale Thin Films on Transparent Elastomeric Substrates", Applied Physics Letters, vol. 96, pp. 1-3, year 2010.

Wong et al., "Analog Tunable Gratings Driven by Thin-Film Piezoelectric Microelectromechanical Actuators", Applied Optics, vol. 42, No. 4, pp. 621-626, Feb. 1, 2003.

Spremo et al., "Piezoelectric Diffraction-Based Optical Switches", NASA Tech Briefs, pp. 13-14, Nov. 2003.

Ji et al., "Soft Tunable Diffractive Optics with Multifunctional Transparent Electrodes Enabling Integrated Actuation", Applied Physics Letters, No. 3, vol. 109, pp. 1-7, year 2016.

Kowarz et al., "Conformal Grating ElectroMechanical System (GEMS) for High-Speed Digital Licht Modulation", Technical Digest of IEEE 15th International Conference on MEMS, pp. 568-573, year 2002.

Zhang et al., "MEMS Grating with Interdigitated-Comb Structure", Key Engineering Materials, vol. 503, pp. 49-54, year 2012.

Bernet et al., "Multi-Color Operation of Tunable Diffractive Lenses", Optics Express, vol. 25, issue 3, pp. 2469-2480, year 2017.

Kress, "Free-Space Micro-Optics," in "Field Guide to Digital Micro-Optics," SPIE Field Guides, vol. FG33, p. 11, year 2014.

O'Shea et al., "Diffractive Optics: Design, Fabrication and Test", SPIE Tutorial Texts in Optical Engineering, vol. TT62, pp. 66-72, SPIE Press, USA 2004.

* cited by examiner

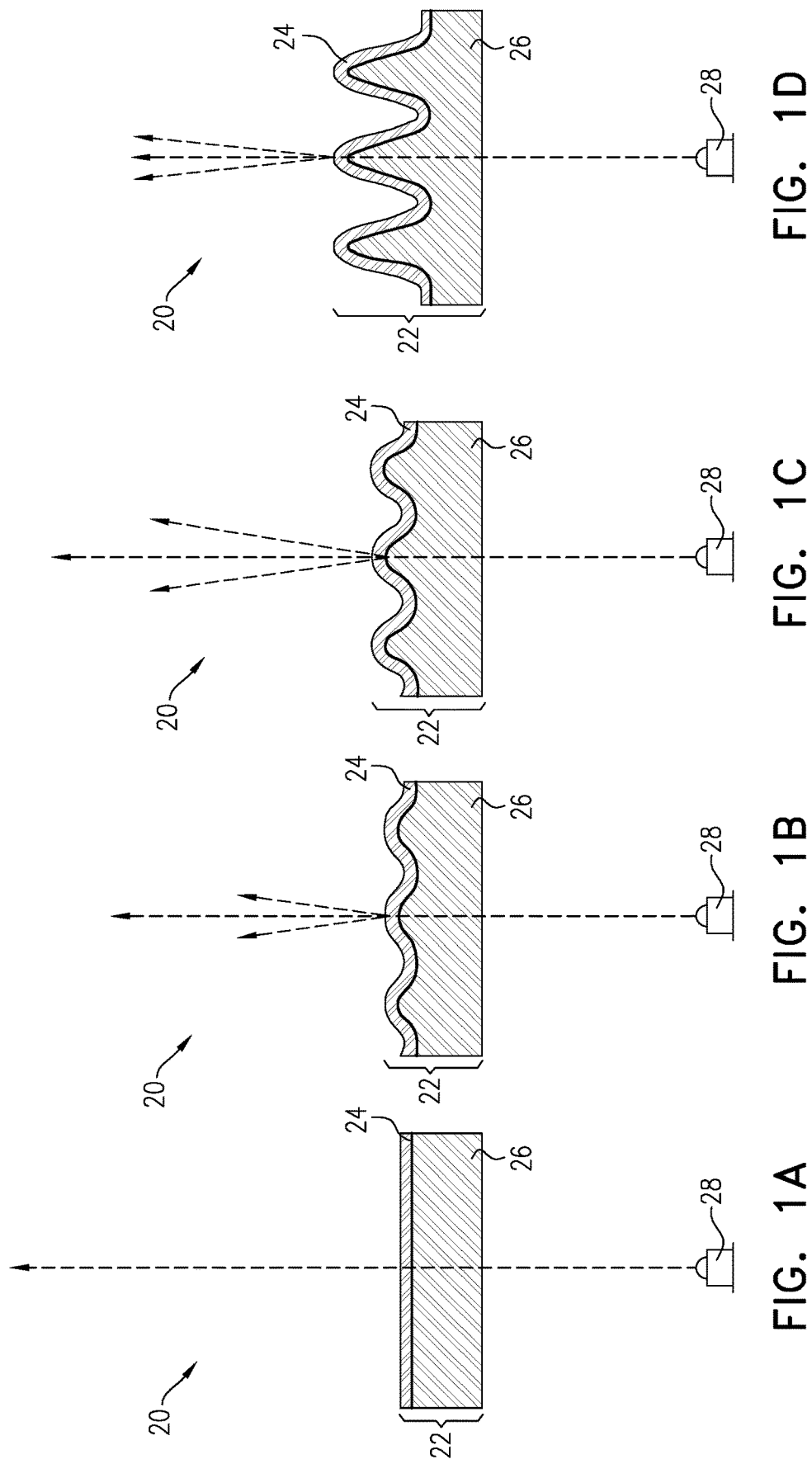

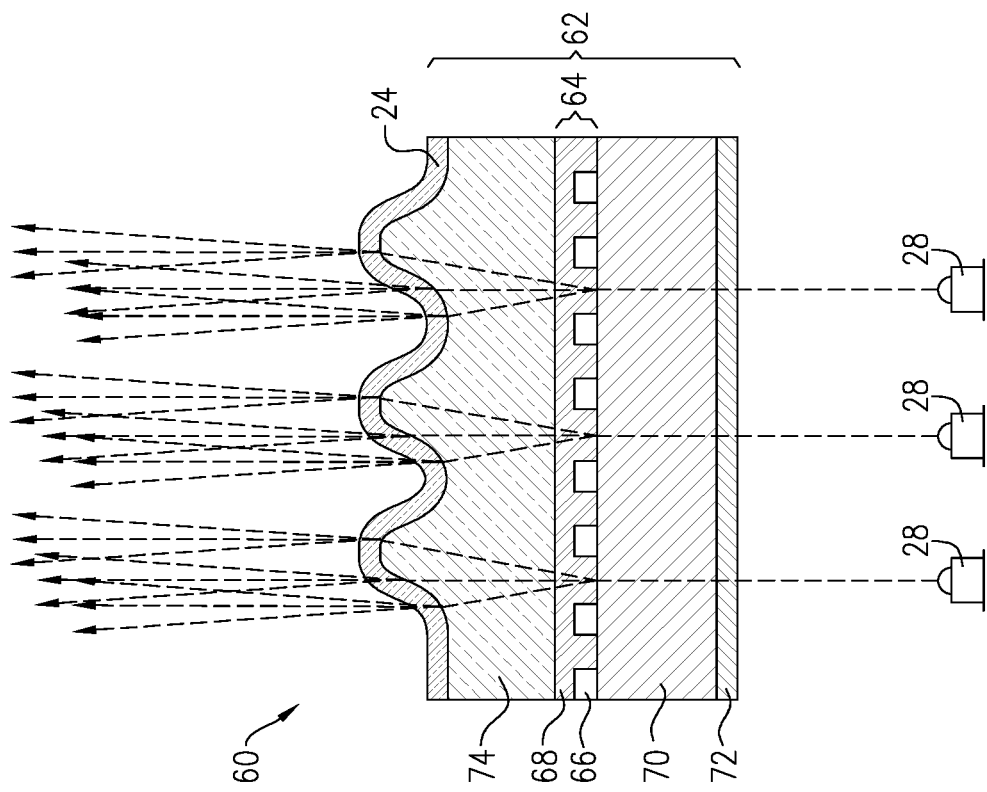
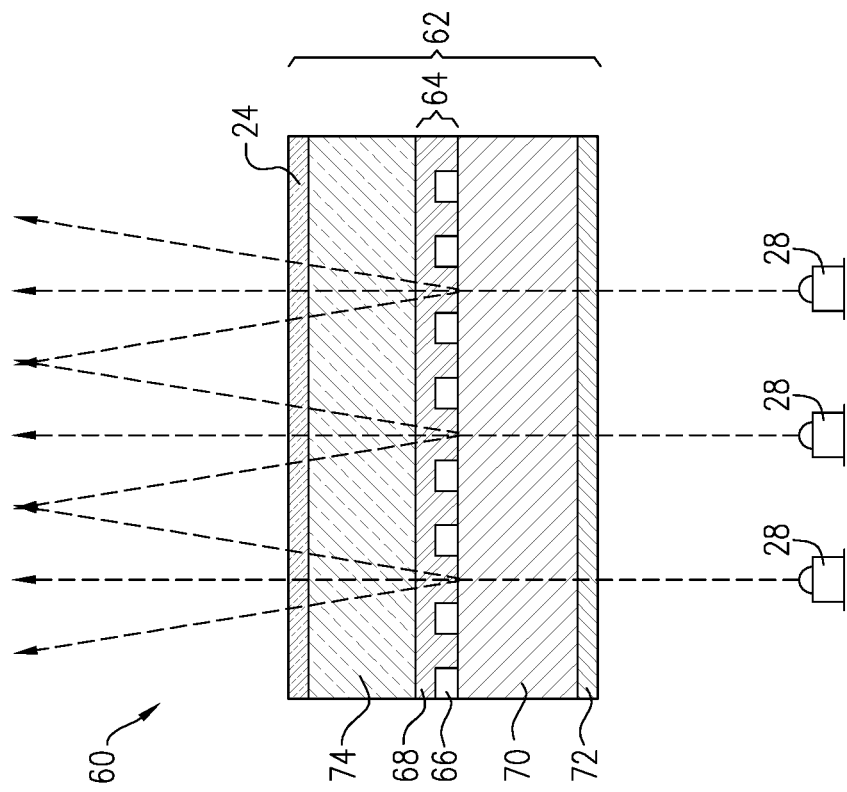

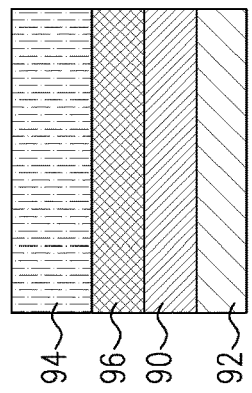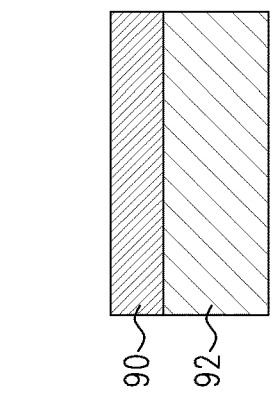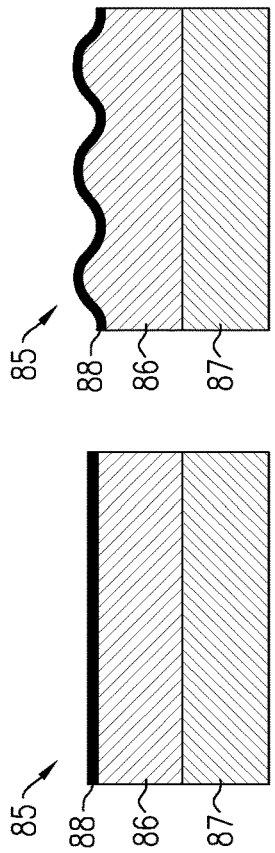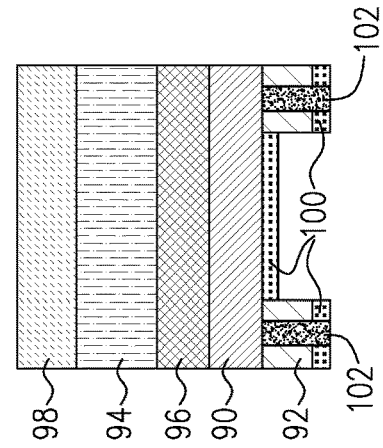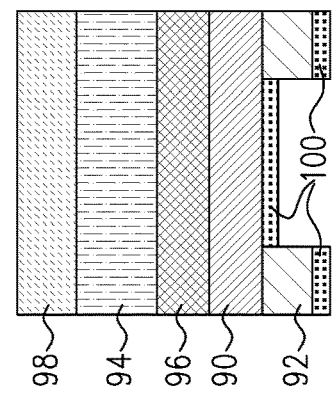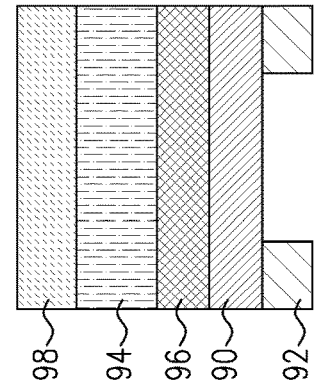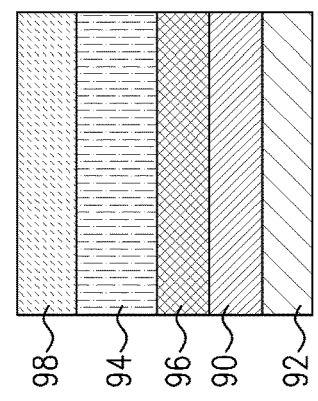

TUNABLE DIFFRACTIVE OPTICS

CROSS-REFERENCE TO RELATED APPLICATION

This application claims the benefit of U.S. Provisional Patent Application 63/030,938, filed May 28, 2020, which is incorporated herein by reference.

FIELD OF THE INVENTION

The present invention relates generally to optical components, and particularly to diffractive optical elements.

BACKGROUND

Diffractive optical elements (DOEs) are optical components with micro-structure patterns that modulate the phase of incident beams of optical radiation. (The term "optical radiation" is used in the present description and in the claims, interchangeably with the term "light," to refer to electromagnetic radiation in any of the visible, ultraviolet and infrared spectral ranges.) DOEs may operate on either transmitted or reflected radiation (or both). The optical effect of the DOE depends on the spacing and depth of the diffractive micro-structure pattern. By appropriate design of this pattern, DOEs can be made to manipulate the incident radiation so as to generate almost any desired far-field intensity pattern in the transmitted or reflected beam. Common applications of DOEs including focusing and shaping of optical beams, as well as beam splitting, diffusion, and pattern generation.

DOEs are typically manufactured either by photolithographic etching of a suitable substrate, such as glass or fused silica, or mass replication by stamping or molding of a polymer surface. Typically, the substrates of these DOEs are rigid, so that once the micro-structure pattern is formed, its optical properties are fixed.

SUMMARY

Embodiments of the present invention that are described hereinbelow provide tunable DOEs and methods for their manufacture and use.

There is therefore provided, in accordance with an embodiment of the invention, an optical component, including a substrate and a piezoelectric film formed on the substrate and configured to deform in response to an actuation voltage applied thereto into a pattern of peaks and troughs configured to deflect optical radiation that is incident thereon. The pattern has an amplitude determined by the actuation voltage.

In some embodiments, in the absence of the actuation voltage, the piezoelectric film assumes a baseline pattern having a baseline amplitude, and application of an actuation voltage to the piezoelectric film causes the piezoelectric film to buckle into a modified pattern having a pattern amplitude greater than the baseline amplitude. Additionally or alternatively, the baseline pattern is planar, such that the baseline amplitude is zero.

In other embodiments, in the absence of the actuation voltage, the piezoelectric film buckles into a baseline pattern having a baseline amplitude, and application of an actuation voltage to the piezoelectric film causes the piezoelectric film to relax into a modified pattern having a pattern amplitude less than the baseline amplitude. In one embodiment, application of a further actuation voltage to the piezoelectric film causes the piezoelectric film to assume a planar shape.

In a disclosed embodiment, the component includes one or more first electrodes applied to a first surface of the piezoelectric film and one or more second electrodes applied to a second surface of the piezoelectric film, opposite the first surface, wherein the actuation voltage is applied between the one or more first electrodes and the one or more second electrodes. Additionally or alternatively, the component includes multiple electrodes applied to a surface of the piezoelectric film, wherein the actuation voltage is applied between one or more pairs of the electrodes.

In a disclosed embodiment, the component includes a reflective coating disposed over the piezoelectric film, such that optical radiation is reflected by the coating and diffracted by the pattern.

In other embodiments, the substrate and the piezoelectric film are transparent to optical radiation, such that the optical radiation transmitted through the piezoelectric film is diffracted by the pattern. In some of these embodiments, the substrate includes a diffractive optical element (DOE), which is configured to apply a diffractive effect to the optical radiation, and buckling of the piezoelectric film modifies the diffractive effect. In one embodiment, the buckling of the piezoelectric film modifies the diffractive effect by changing a spacing between elements of a diffractive structure in the DOE. Alternatively or additionally, the buckling of the piezoelectric film diffracts the optical radiation that is diffracted by the DOE (either after or prior to the diffraction of the optical radiation by the DOE).

In a disclosed embodiment, the substrate includes an elastomer.

Alternatively or additionally, the substrate includes an array of cavities adjacent to the piezoelectric film, and application of the actuation voltage causes the piezoelectric film to buckle over the cavities. In a disclosed embodiment, the substrate includes a semiconductor material, which is etched to define the cavities. Further alternatively or additionally, the array includes interleaved first and second sets of the cavities, wherein the piezoelectric film is configured to buckle away from the substrate over the cavities in the first set and toward the substrate over the cavities in the second set. In one embodiment, buckling of the piezoelectric film away from and toward the substrate over the cavities causes the substrate to bend.

In some embodiments, the pattern of peaks and troughs is configured to diffract optical radiation that is incident thereon. In an alternative embodiment, the pattern of peaks and troughs is configured to refract optical radiation that is incident thereon.

There is also provided, in accordance with an embodiment of the invention, a method for producing an optical component. The method includes depositing piezoelectric film on a substrate. An actuation voltage is applied to the piezoelectric film so as to cause the piezoelectric film to buckle into a pattern of peaks and troughs configured to diffract optical radiation that is incident thereon, the pattern having an amplitude determined by the actuation voltage.

In a disclosed embodiment, the substrate is not pre-strained while the piezoelectric film is deposited thereon.

The present invention will be more fully understood from the following detailed description of the embodiments thereof, taken together with the drawings in which:

BRIEF DESCRIPTION OF THE DRAWINGS

FIGS. 1A, 1B, 1C and 1D are schematic sectional views of an optical device including a tunable DOE in different, respective stages of actuation, in accordance with an embodiment of the invention;

FIGS. 5A and 5B are schematic sectional views of an optical pattern projection device in different, respective stages of actuation, in accordance with an embodiment of the invention;

FIGS. 8A and 8B are schematic sectional views of a tunable refractive optical element in different, respective stages of actuation, in accordance with an alternative embodiment of the invention; and FIGS. 9A, 9B, 9C, 9D, 9E and 9F are schematic sectional views of a thin film stack showing successive stages in fabrication of a tunable DOE, in accordance with an embodiment of the invention.

DETAILED DESCRIPTION OF EMBODIMENTS

Overview

Figure 2A:
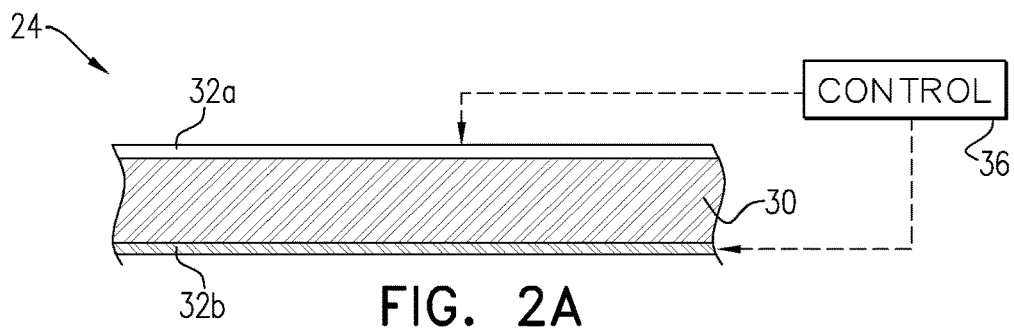
FIGS. 2A and 2B are schematic sectional views of piezoelectric stacks with actuation electrodes, in accordance with embodiments of the invention.

Although DOEs are capable of performing a wide range of functions, their optical properties are typically fixed at the time of manufacture. Tunable diffractive components are available, for example acousto-optic modulators, but they are too large, costly and power-hungry for most applications. Embodiments of the present invention that are described herein address the need for compact, inexpensive tunable DOEs. By forming the DOE on a flexible substrate, these embodiments make it possible to tune the optical properties of the DOE by stretching or compressing the diffractive structure using piezoelectric effects.

The disclosed embodiments provide optical components in which a piezoelectric film is formed on a substrate and is configured to deform into a pattern of peaks and troughs in response to an actuation voltage applied to the film. The amplitude of the pattern (and possibly the pitch, as well, to a lesser extent) is determined by the actuation voltage that is applied to the film and can range from tens of nanometers up to about 10 µm. Thus, the optical properties of the component, such as the focal length or deflection angle, can be tuned simply by varying the actuation voltage. In most of the embodiments that are described hereinbelow, the pattern of peaks and troughs formed by the piezoelectric film diffracts incident optical radiation. Alternatively, however, the pattern of peaks and troughs may be configured to refract the incident optical radiation.

The state of the substrate and the conditions of deposition of the piezoelectric film determine whether the piezoelectric film buckles or not in the absence of an actuation voltage (i.e., with no voltage applied to the film). In one embodiment, the piezoelectric film is designed and fabricated so as to assume a baseline pattern, having a certain baseline amplitude, in the absence of an actuation voltage. (The baseline amplitude may be zero, meaning that the baseline pattern can be planar, with no pre-buckling of the piezoelectric film.) Application of certain actuation voltages to the piezoelectric film will then cause the piezoelectric film to buckle into a pattern having an amplitude greater than the baseline amplitude. Application of other actuation voltages may cause the piezoelectric film to relax into a pattern having a lower amplitude less than the baseline amplitude and may even cause the piezoelectric film to assume a planar shape. For example, an actuation voltage can be applied between electrodes on opposing surfaces of the piezoelectric film in order to cause the film to contract. Alternatively, an actuation voltage can be applied between pairs of electrodes on the same surface of the film in order to cause it to elongate. In some embodiments, the film may assume a planar shape upon application of an appropriate actuation voltage.

The piezoelectric film may be designed and fabricated so that it is capable only of elongating thus increasing the buckling amplitude relative to the baseline amplitude, or only contracting, thus decreasing the baseline amplitude. In some embodiments, as noted above, the baseline amplitude is zero, i.e., the component will apply a tunable diffractive effective only when an actuation voltage is applied.

Optical components in accordance with embodiments of the present invention may operate as either transmissive or reflective DOEs. For reflective operation, a reflective coating may be formed over the piezoelectric film. Transmissive operation is possible when the piezoelectric film and the substrate are transparent at the wavelength of the optical radiation that is to be diffracted, for example in the near infrared range. In this latter case, in some embodiments, the substrate itself comprises a DOE, and buckling of the piezoelectric film modifies the inherent diffractive properties of the DOE.

The embodiments described below use various different types of substrates, such as an elastomer or a semiconductor-based thin film structure. In some embodiments, the substrate comprises an array of cavities adjacent to the piezoelectric film, formed by etching the substrate, for example. Application of the actuation voltage causes the piezoelectric film to buckle over these cavities. This sort of structured substrate enables more complex tunable diffractive functionalities, which are described in greater detail hereinbelow.

System Description

FIGS. 1A, 1B, 1C and 1D are schematic sectional views of an optical device 20 including a tunable DOE 22 in different, respective stages of actuation, in accordance with an embodiment of the invention. In this embodiment, DOE 22 operates in transmission mode, to diffract optical radiation emitted by a radiation source 28 into multiple diffraction orders. Alternatively, the principles and materials described below may be applied, mutatis mutandis, in producing reflective DOEs.

To produce DOE 22, a piezoelectric stack 24 is formed on a substrate 26. Substrate 26 may comprise any material or combination of materials having suitable mechanical and optical properties to enable controlled buckling of the piezoelectric film, such as a suitable elastomer, for example a siloxane-based polymer, or a structured thin-film material (as described below, for example, with reference to FIGS. 3A-C). To enable piezoelectric stack 24 to buckle freely and maintain good optical behavior of DOE 22, it is advantageous that the elastomer have a low Young's modulus (for example, less than 200 MPa), low viscoelasticity, and stable properties over the range of temperatures that are encountered in production and use of DOE 22 (for example, −40° C. to 400° C.). Specifically, for transmissive operation of DOE, it is desirable that the refractive index of substrate 26 be substantially greater than that of the operating environment (for example, substantially greater than 1 when operating in ambient air) and stable over the operating temperature range. The thickness of the elastomer used in substrate 26 can typically be in a range of several microns to several hundred microns, although thinner or thicker substrate layers may alternatively be used. Substrate 26 may also comprise a thicker supporting layer, such as a glass substrate below the elastomer, to enhance the mechanical and thermal stability of DOE 22.

Piezoelectric stack 24, in this embodiment and the embodiments described below, comprises one or more layers of piezoelectric thin film, along with actuation electrodes (as shown in FIG. 2) and possibly other, ancillary thin film layers. The piezoelectric film comprises one or more suitable piezoelectric materials, such as lead zirconate titanate (PZT) or aluminum nitride (AlN) or a polymer, such as polyvinylidene fluoride (PVDF). When PZT is used, for example, the thickness of the PZT film is typically between 0.5 μm and 2 μm, although thinner or thicker films may be used depending on application requirements. For enhanced performance, other materials may be added to the piezoelectric film, for example adding Nb dopant to PZT or Sc dopant to AlN, or mixing trifluoroethylene (TrFE) with PVDF to make it ferroelectric.

Ancillary thin film layers may be added over and/or below the piezoelectric film to enhance optical and mechanical performance. For example, layers of $SiO_2$, SiN or polysilicon may be added and patterned to control the spatial pattern of buckling of stack 24. Additionally or alternatively, metal layers may be added to enhance or reduce rejection, such as thin layers of aluminum, gold, silver, titanium or molybdenum. It is also possible to spin-coat the piezoelectric film with polymer layers.

FIG. 2A is a schematic sectional view of piezoelectric stack 24, showing actuation electrodes 32a and 32b, in accordance with an embodiment of the invention. (Electrodes 32a and 32b are collectively referred to as electrodes 32.) Electrodes 32 comprise thin conducting films, which are deposited on opposing surfaces of a piezoelectric film 30, such as PZT. The electrodes comprise, for example, a suitable metal, such as platinum or ruthenium, or a transparent conductive material such as indium tin oxide (ITO).

Control circuitry 36 applies actuation voltages between the electrodes in order to control the buckling of film 30. Specifically, application of an actuation voltage between electrode 32a and electrode 32b will actuate the d31 piezoelectric coefficient of the PZT, leading to in-plane contraction of film 30, i.e., shortening in the horizontal dimension. Alternatively, when other sorts of piezoelectric films are used, such as AlN or PVDF-based materials, application of actuation voltages between electrodes 32a and 32b may cause either contraction or elongation, depending on the polarity of the voltage (in the case of AlN) or of the piezoelectric material (in PVDF).

Figure 2B:
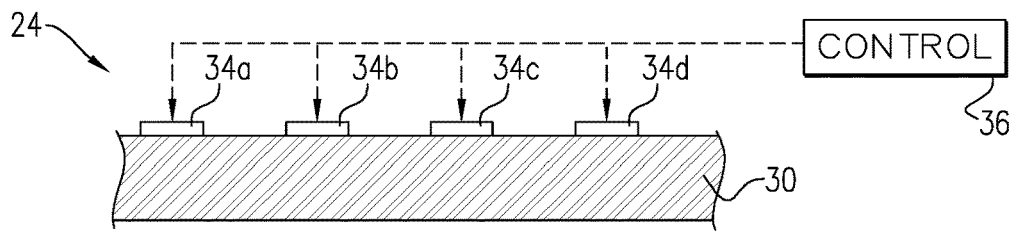

FIG. 2B is a schematic sectional view of piezoelectric stack 24, showing actuation electrodes 34a, 34b, 34c and 34d, in accordance with an alternative embodiment of the invention. (Electrodes 34a-d are collectively referred to as electrodes 34.) Application of an actuation voltage between pairs of electrodes 34, such as between electrodes 34a and 34b, will actuate the d33 piezoelectric coefficient of the PZT, leading to in-plane elongation. This electrode configuration may not be appropriate for some types of piezoelectric films, such as AlN. With PVDF-based films, application of actuation voltages between pairs of electrodes 34 may cause either contraction or elongation, depending on the polarity of the material.

Electrodes 32 and 34 are typically thin, in the range of a few nanometers thick up to around 100 nm. For d33 actuation, the transverse dimensions of electrodes 34 are small, typically no greater a few microns, or possibly smaller.

In the example shown in FIG. 1A, the baseline pattern of piezoelectric stack 24 is planar, so that DOE 22 has no diffractive effect in the absence of an actuation voltage. Assuming the piezoelectric stack to comprise PZT, application of the actuation voltage between pairs of electrodes 34a-34d causes piezoelectric stack 24 to buckle into a pattern of peaks and troughs, and thus to diffract the optical radiation that is emitted by radiation source 28 and incident on DOE 22. The amplitude of the pattern and possibly the pitch, as well, are determined by the actuation voltage. Thus, as shown in FIGS. 1B-1D, increasing the actuation voltage causes DOE 22 to deflect increasing fractions of the incident beam into higher diffraction orders. (Although only the ±1 orders are shown here, in practice many diffraction orders may be created.)

Alternatively, DOE 22 may be configured so that actuation using electrodes 32a and 32b on opposing sides of the film causes piezoelectric stack 24 to contract. In this case, FIG. 1D could represent the baseline pattern, while FIGS. 1C-1A illustrate the decrease in pattern amplitude with increasing actuation voltage.

As FIG. 1A-D, FIG. 2A-B, and the other figures in this application are sectional views, electrodes 32 and 34 appear to be linear structures, which give rise to diffraction of the incident radiation in the plane of the page of the drawings. This sort of arrangement of the electrodes is possible and useful. In alternative embodiments, however, the electrodes may be disposed on the surfaces of piezoelectric film in two-dimensional arrangements, such as rectangular or circular structures. In such embodiments, actuation of piezoelectric stack 24 will cause buckling into two-dimensional patterns of peaks and troughs, thus diffracting the incident radiation in two dimensions. Depending on the structure and arrangement of the electrodes and the piezoelectric stack, the resulting tunable DOE may be used for splitting the incident beam into multiple diffraction orders, as illustrated in FIGS. 1A-D, or to perform other optical functions, such as beam deflection and/or focusing.

The elastomer in substrate 26 may be pre-strained (for example, stretched) during deposition of piezoelectric stack 24, in which case the piezoelectric stack will buckle in the absence of the actuation voltage due to the internal strain in the substrate. Thus, in the absence of actuation voltage, piezoelectric stack 24 in DOE 22 will buckle into a baseline pattern having a non-zero baseline amplitude. Alternatively, piezoelectric stack 24 may be deposited on substrate 26 without pre-straining the substrate. In this case, the baseline pattern of DOE 22 will be planar (as shown in FIG. 1A), and the level of voltage applied between electrodes 32 and electrode 34 will determine the amplitude of the pattern of peaks and troughs formed by the DOE.

Tunable Doe with Structured Substrate

Figure 3A:
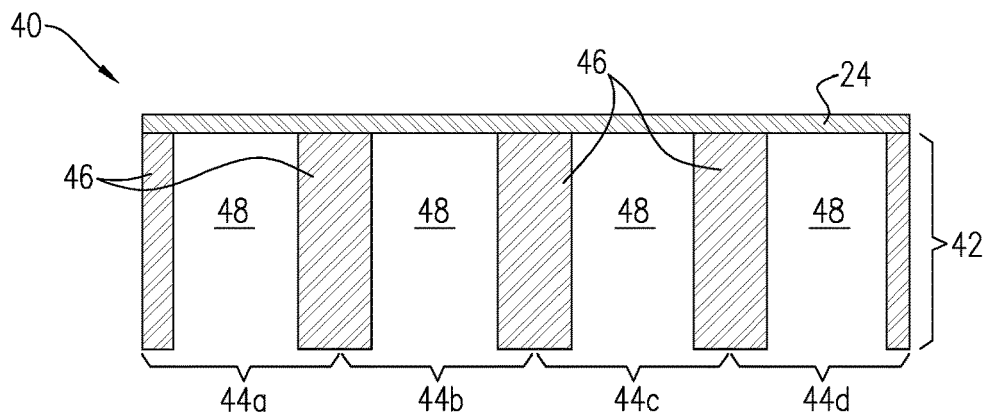
FIGS. 3A and 3B are schematic sectional view of a tunable DOE in different, respective stages of actuation, in accordance with another embodiment of the invention.
Figure 3B:
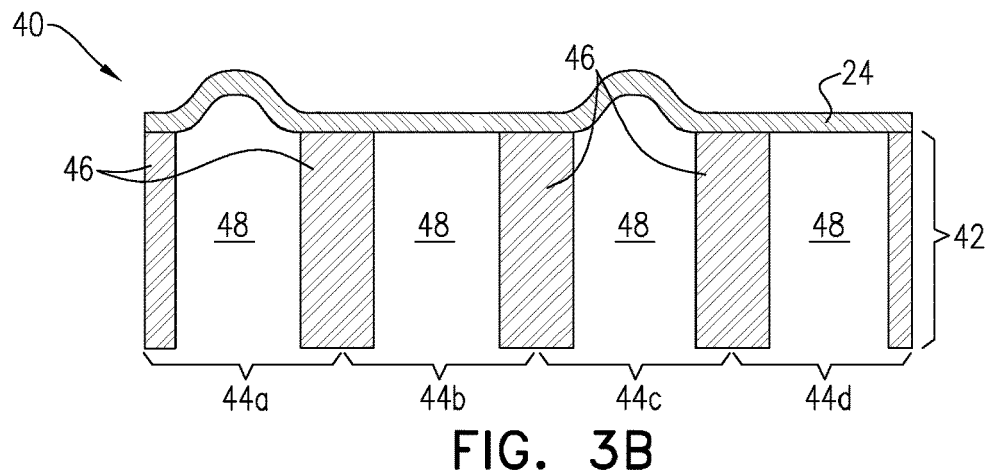

FIGS. 3A and 3B are schematic sectional view of a tunable DOE 40 in different, respective stages of actuation, in accordance with another embodiment of the invention. DOE 40 in this embodiment comprises a substrate 42 comprises an array of structured cells 44a, 44b, 44c, 44d, .

. . . (referred to collectively as cells 44). Each cell 44 comprises a respective cavity 48, which is formed, for example by etching a substrate material 46. Actuation of piezoelectric stack 24 in DOE 40 causes the piezoelectric film to buckle over cavities 48.

The arrangement of cells 44 thus determines the pitch of the pattern of peaks and troughs formed by piezoelectric stack 24. The piezoelectric stack and electrodes (not shown in this figure) can be configured to enable selective bending over certain cavities and not others, as shown in FIG. 3B. Thus, the diffractive properties of DOE 40 can be precisely controlled.

Figure 3C:
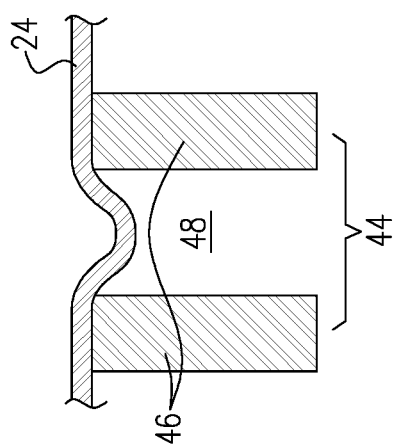
FIG. 3C is a schematic detail view of a tunable DOE in an alternative mode of actuation, in accordance with an embodiment of the invention.

FIG. 3C is a schematic detail view of one of cells 44 in DOE 40 in an alternative mode of actuation, in accordance with an embodiment of the invention. In this case, actuation of the piezoelectric film over cavity 48 causes stack 24 to buckle inward toward substrate 42, into cavity 48, in contrast to the film in cells 44a and 44c (FIG. 3B), which buckles away from the substrate. The array of cells 44 may comprise interleaved sets of cavities 48, wherein piezoelectric stack 24 buckles away from substrate 42 over the cavities in one set and toward substrate 42 over the cavities in the other set.

The buckling behavior may be controlled, for example, by depositing layers of $SiO_2$ (not shown) above and below the piezoelectric film in stack 24, and patterning the layers of $SiO_2$ differently depending on the desired direction of buckling. To permit the sort of downward bucking that is shown in FIG. 3C, substrate 42 on the inner side of the piezoelectric stack is etched so as to support the desired buckling mode.

In some embodiments, substrate material 46 comprises a semiconductor material, such as single-crystal or amorphous silicon. Cells 44 can be produced, for example, by depositing piezoelectric stack 24 over a suitable thin film layer or directly on a silicon wafer, and then patterning and etching cavities 48 through the wafer. The wafer is then thinned away so that the remaining substrate is sufficiently flexible to allow the piezoelectric stack to buckle.

Figure 4:
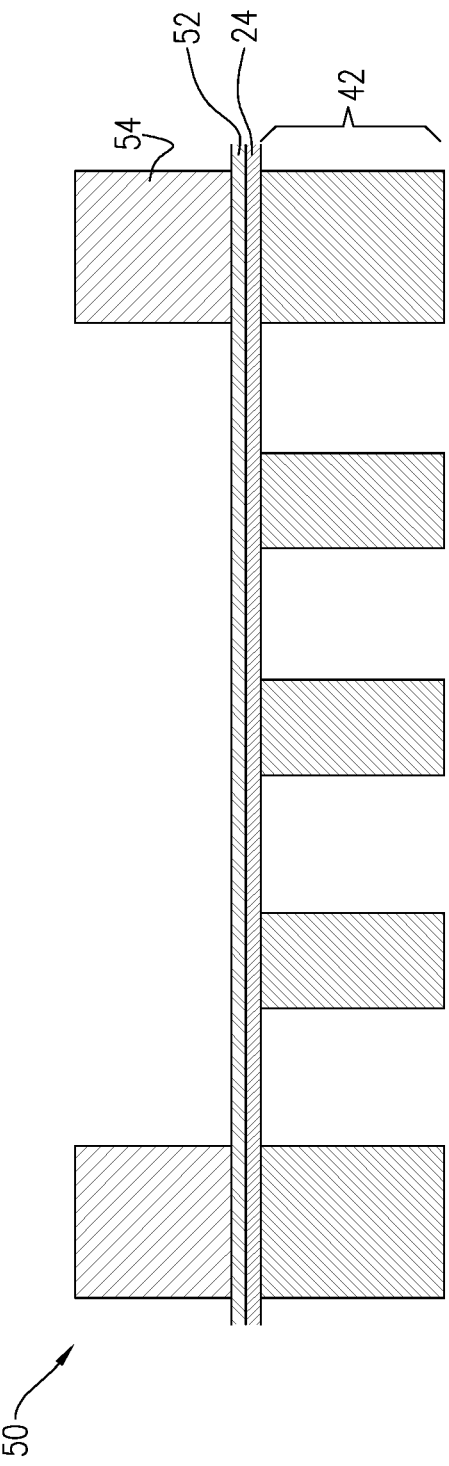
FIG. 4 is a schematic sectional view of a tunable DOE, in accordance with yet another embodiment of the invention.

FIG. 4 is a schematic sectional view of a tunable DOE 50, in accordance with yet another embodiment of the invention. Substrate 42 of DOE 50 is similar to that shown in FIGS. 3A-C, comprising an array of cavities; but the principles of this embodiment may similarly be applied to a tunable DOE on an elastomeric substrate. A reflective coating 52 is deposited over piezoelectric stack 24, such that optical radiation is reflected by the coating and thus diffracted by the pattern formed when the piezoelectric stack buckles. An anchoring structure 54, comprising one or more layers of silicon, for example, is formed at the edges of DOE 50 in order to strengthen the buckling effect during actuation.

Alternatively, anchoring structures of this sort may be used with transmissive DOEs, with or without coating 52. Similarly, coating 52 may be applied with or without anchoring structure 54, and may alternatively comprise an anti-reflective coating when the DOE is transmissive. Patterns of cells 44 and/or anchoring structures 54 may be combined with an elastomer substrate to define additional features of the buckling pattern. Additionally or alternatively, a fluid with high refractive index may be injected on one side of piezoelectric stack 24 in order to enhance the diffractive effect.

Piezoelectric Film Over Doe Substrate

FIGS. 5A and 5B are schematic sectional views of an optical pattern projection device 60 in different, respective stages of actuation, in accordance with an embodiment of the invention. In this embodiment, a tunable optical component 62 comprises a piezoelectric stack 24, which is deposited over a substrate that comprises a DOE 64. This DOE itself applies a diffractive effect to optical radiation emitted by radiation sources 28. Buckling of piezoelectric stack 24, as shown in FIG. 5B, modifies the inherent diffractive effect of DOE 64.

DOE 64 comprises a pattern layer 66, which is etched or imprinted on the surface of a transparent substrate 70, such as a glass or fused silica wafer. Pattern layer 66 has a relatively high index of refraction and is overlaid by a layer 68 of transparent material, such as a polymer, having a lower index of refraction. An anti-reflection coating 72 can be deposited over the back side of substrate 70. An elastomer layer 74 is formed over DOE 64, and piezoelectric stack 24 is deposited over the elastomer layer, as described above.

In this example, DOE 64 splits the incident beam from each radiation source 28 into multiple sub-beams, thus projecting a predefined pattern of radiation into the far field, as illustrated in FIG. 5A. In FIG. 5B, piezoelectric stack 24 is actuated so as to buckle, and the resulting pattern of peaks and troughs diffracts the optical radiation that has been diffracted by DOE 64, thus modifying the pattern. If the actuation voltage applied to the piezoelectric stack is swept over a range of voltages, the diffracted beams will spread across the far field. The projected pattern can thus effectively be homogenized. This sort of modulation can be used, for example, to switch between patterned and flood radiation in a pattern-based depth mapping and imaging system. In alternative embodiments (not shown in the figures), the piezoelectric stack can be used to modify the diffractive effect of the DOE in other ways, such as changing the focal power and/or angle of deflection of the output beam or beams.

In an alternative embodiment (not shown in the figures), tunable optical component 62 is inverted relative to the orientation shown in FIGS. 5A/B, so that piezoelectric stack 24 faces toward radiation sources 28. In this case, the radiation emitted by sources 28 is diffracted first by the piezoelectric stack and then by DOE 64.

Alternative Embodiments

Figure 6:
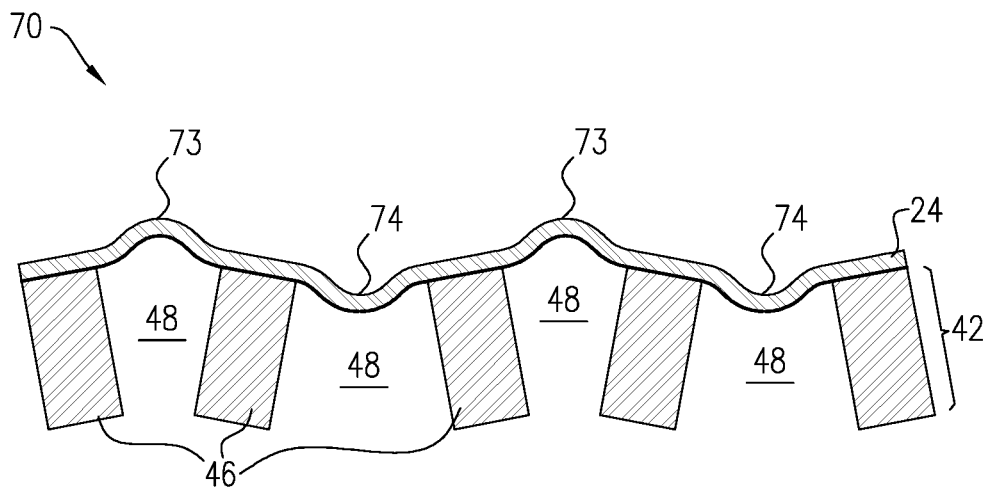
FIGS. 6 and 7 are schematic sectional views of tunable DOEs, in accordance with further embodiments of the invention.

FIG. 6 is a schematic sectional view of a tunable DOE 70, in accordance with a further embodiment of the invention. In this case, piezoelectric stack 24 and substrate 42 are formed in the manner described above with reference to FIGS. 3A-C, with cavities 48 adjacent to the piezoelectric stack. Piezoelectric stack 24 is patterned to define two interleaved sets of cells 73 and 74, wherein the piezoelectric stack buckles away from substrate 42 in cells 73 and toward substrate 42 in cells 74. Substrate material 46 is sufficiently thin and flexible so that the alternating buckling in cells 73 and 74 causes the substrate to bend, as shown in the figure. This bending intensifies the diffractive effect as DOE 70 is tuned.

If a thin, flexible DOE, is bonded to piezoelectric stack 24 in a configuration like that shown in FIG. 6, the buckling of piezoelectric stack 24 will likewise bend the DOE.

Figure 7:
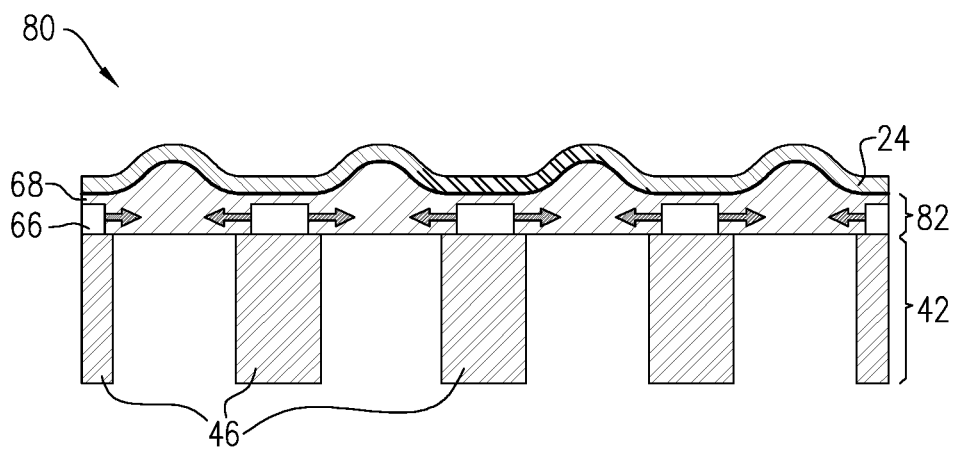

FIG. 7 is a schematic sectional view of a tunable diffractive component 80, in accordance with an alternative embodiment of the invention. In this embodiment, piezoelectric stack 24 is formed over a DOE 82, comprising a pattern layer 66 overlaid by a layer 68 of transparent material, such as a flexible polymer. Buckling of the piezoelectric film modulates the diffractive effect of DOE 82 by changing the spacing between elements of the diffractive structure in DOE 82. In other words, as piezoelectric stack 24 buckles, it causes the cavities in substrate to narrow, thus drawing the elements of pattern layer 66 closer together and modulating the diffractive effect.

FIGS. 8A and 8B are schematic sectional views of a tunable refractive optical element 85 in different, respective stages of actuation, in accordance with an alternative embodiment of the invention. In this embodiment, a relatively thick piezoelectric film 86, such as a PVDF-based film having a thickness of a few micrometers, is deposited over an elastomeric substrate 87. A thin film 88, such as a dielectric film comprising SiN or SiO$_2$, or a conductive film comprising Pt or ITO, for example, is deposited over piezoelectric film 86. In the absence of actuation, as shown in FIG. 8A, optical element 85 remains flat and exerts no refractive effect on incident optical radiation. Actuation of piezoelectric film 86 causes the piezoelectric material to expand and thus induce buckling of thin film 88, as shown in FIG. 8B. Optical radiation passing through optical element 85 will thus undergo refraction due to the deformation of the surface.

Method of Fabrication

FIGS. 9A, 9B, 9C, 9D, 9E and 9F are schematic sectional views of a thin film stack showing successive stages in a process of fabrication of a tunable DOE, in accordance with an embodiment of the invention. These stages are shown by way of example and may be modified to create the various different sorts of component structures that are shown in the preceding figures, as will be apparent to those skilled in the art after reading the present description. Although FIGS. 9A-F illustrate the fabrication of a single DOE, in practice multiple DOEs of this sort are produced in a wafer-scale process, and are then diced apart at the conclusion of the process.

Initially, as shown in FIG. 9A, a piezoelectric stack 90 is deposited on a fabrication substrate, such as a silicon wafer 92. As explained above, piezoelectric stack 90 comprises a piezoelectric film, such as a PZT film, together with ancillary materials and electrodes. Piezoelectric stack 90 is then bonded to a rigid, transparent substrate 94, such as a glass wafer, by a polymer bonding layer 96, as shown in FIG. 9B. Layer 96 typically comprises a suitable elastomer, as described above. After bonding stack 90 to substrate 94, wafer 92 is thinned. An antireflective coating 98 is deposited on the back side of substrate 94, as shown in FIG. 9C.

To release piezoelectric stack 90 and prepare it for actuation, wafer 92 is etched away from the front surface of the stack, as shown in FIG. 9D. In the pictured embodiment, an anchoring structure is left around the edge of the active area of piezoelectric stack 90. An antireflective coating 100 is deposited over this active area, as shown in FIG. 9E. Finally, vias 102 are etched through wafer 92 and filled with metal to contact the electrodes of piezoelectric stack 90, as shown in FIG. 9F. Vias 102 provide connection pads through which control circuitry can be connected to actuate the PZT film.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical component, comprising:
a transparent substrate comprising diffractive optical element (DOE), which is configured to apply a diffractive effect to optical radiation transmitted through the substrate;
a transparent piezoelectric film formed on the substrate and configured to deform in response to an actuation voltage applied thereto into a pattern of peaks and troughs configured to deflect optical radiation that is incident thereon, the pattern having an amplitude determined by the actuation voltage, such that buckling of the piezoelectric film modifies the diffractive effect applied by the DOE to the transmitted optical radiation; and
electrodes configured to apply the actuation voltage to at least one surface of the piezoelectric film.

2. The component according to claim 1, wherein in the absence of the actuation voltage, the piezoelectric film assumes a baseline pattern having a baseline amplitude, and wherein application of an actuation voltage to the piezoelectric film causes the piezoelectric film to buckle into a modified pattern having a pattern amplitude greater than the baseline amplitude.

3. The component according to claim 2, wherein the baseline pattern is planar, such that the baseline amplitude is zero.

4. The component according to claim 1, wherein in the absence of the actuation voltage, the piezoelectric film buckles into a baseline pattern having a baseline amplitude, and application of an actuation voltage to the piezoelectric film causes the piezoelectric film to relax into a modified pattern having a pattern amplitude less than the baseline amplitude.

5. The component according to claim 4, wherein application of a further actuation voltage the to piezoelectric film causes the piezoelectric film to assume a planar shape.

6. The component according to claim 1, wherein the electrodes comprise multiple electrodes applied to a single surface of the piezoelectric film, wherein the actuation voltage is applied between one or more pairs of the electrodes.

7. The component according to claim 1, wherein the electrodes comprise one or more first electrodes applied to a first surface of the piezoelectric film and one or more second electrodes applied to a second surface of the piezoelectric film, opposite the first surface, wherein the actuation voltage is applied between the one or more first electrodes and the one or more second electrodes.

8. The component according to claim claim 1, wherein the buckling of the piezoelectric film modifies the diffractive effect by changing a spacing between elements of a diffractive structure in the DOE.

9. The component according to claim 1, wherein the buckling of the piezoelectric film diffracts the optical radiation that is diffracted by the DOE.

10. The component according to claim 1, wherein the substrate comprises an elastomer.

11. The component according to claim 1, wherein the substrate comprises an array of cavities adjacent to the piezoelectric film, and wherein application of the actuation voltage causes the piezoelectric film to buckle over the cavities.

12. The component according to claim 11, wherein the substrate comprises a semiconductor material, which is etched to define the cavities.

13. The component according to claim 11, wherein the array comprises interleaved first and second sets of the cavities, wherein the piezoelectric film is configured to buckle away from the substrate over the cavities in the first set and toward the substrate over the cavities in the second set.

14. The component according to claim 13, wherein buckling of the piezoelectric film away from and toward the substrate over the cavities causes the substrate to bend.

15. The component according to claim 1, wherein the pattern of peaks and troughs is configured to diffract the optical radiation that is incident thereon.

16. The component according to claim 1, wherein the pattern of peaks and troughs is configured to refract the optical radiation that is incident thereon.

17. A method for producing an optical component, the method comprising:

depositing a transparent piezoelectric film on a transparent substrate comprising a diffractive optical element (DOE), which is configured to apply a diffractive effect to optical radiation transmitted through the substrate;

applying electrodes to at least one surface of the piezoelectric film; and applying an actuation voltage through the electrodes to the piezoelectric film so as to cause the piezoelectric film to deform into a pattern of peaks and troughs configured to deflect optical radiation that is incident thereon, the pattern having an amplitude determined by the actuation voltage, such that buckling of the piezoelectric film modifies the diffractive effect applied by the DOE to the transmitted optical radiation.

18. The method according to claim 17, wherein the substrate is not pre-strained while the piezoelectric film is deposited thereon.

* * * * *